US007143659B2

(12) United States Patent
Stout et al.

(10) Patent No.: US 7,143,659 B2
(45) Date of Patent: Dec. 5, 2006

(54) PIPE-INSPECTION SYSTEM

(75) Inventors: John Hugo Stout, Buckeye, AZ (US); Kelly Thomas Richmond, Goodyear, AZ (US)

(73) Assignee: Pinnacle West Capital Corporation, Phoenix, AZ (US)

( * ) Notice: Subject to any disclaimer, the term of this patent is extended or adjusted under 35 U.S.C. 154(b) by 346 days.

(21) Appl. No.: 10/322,193

(22) Filed: Dec. 17, 2002

(65) Prior Publication Data

US 2004/0112152 A1 Jun. 17, 2004

(51) Int. Cl.
*F16L 55/26* (2006.01)

(52) U.S. Cl. ........................ 73/865.8; 73/623; 324/71.2

(58) Field of Classification Search .................. 73/623, 73/622, 865.8, 865.9, 628, 624, 866.5; 324/71.2
See application file for complete search history.

(56) References Cited

U.S. PATENT DOCUMENTS 2,573,799 A 11/1951 MacLean
2,992,390 A 7/1961 De Witte
3,060,377 A 10/1962 Schmidt
3,243,697 A 3/1966 Schmidt
3,417,325 A 12/1968 McCullough et al.
3,495,546 A * 2/1970 Brown et al. ............... 104/155
3,532,969 A 10/1970 McCullough et al.
3,882,606 A * 5/1975 Kaenel et al. ................ 33/544
4,085,510 A * 4/1978 Kirschke ................... 33/544.3
4,146,791 A * 3/1979 Dahl et al. ..................... 378/59
4,249,810 A * 2/1981 O'Connor et al. ............ 396/19
4,292,588 A 9/1981 Smith
4,292,589 A 9/1981 Bonner
4,372,161 A 2/1983 de Buda et al.
4,546,314 A 10/1985 Minerbo et al.
4,621,532 A 11/1986 Takagi et al.
4,633,177 A 12/1986 David et al.
4,644,272 A 2/1987 Janos
4,770,105 A 9/1988 Takagi et al.
4,808,927 A 2/1989 Cecco et al.
4,855,676 A 8/1989 Cecco et al.
4,866,978 A 9/1989 Biggerstaff
4,945,775 A 8/1990 Adams et al.
5,049,817 A 9/1991 Cecco et al.
5,204,622 A 4/1993 McCaslin et al.
5,210,492 A 5/1993 Hosohara et al.
5,214,379 A 5/1993 Chern
5,313,838 A 5/1994 Gondard et al.
5,329,824 A 7/1994 Carapezza et al.

(Continued)

*Primary Examiner*—Hezron Williams
*Assistant Examiner*—David A. Rogers
(74) *Attorney, Agent, or Firm*—Meschkow & Gresham, PLC

(57) ABSTRACT

A pipe-inspection system (100) is provided. The system (100) is made up of a transmission cluster (104) incorporating a transmission unit (800) between first and second wheeled guidance units (400), and a reception cluster (104") incorporating a reception unit (1400) between third and fourth wheeled guidance units (400). Each wheeled guidance unit (400) contains a plurality of wheels (416) radially disposed in each of a plurality of planes (420, 426, 432). Transmission unit (800) contains a transmission device (1004). Reception unit (1400) contains a reception device (1604). The system (100) is compatible with RFEC inspection techniques to inspect a pipeline (102), where transmission and reception devices (1004, 1604) are an RFEC transmitter and receiver, respectively. A lead line (106) is attached to the first guidance unit (400) to move the system (100) in a forward direction (108). Similarly, a trail line (110) is attached to the fourth guidance unit (400") to move the system (100) in a reverse direction (112).

29 Claims, 7 Drawing Sheets

U.S. PATENT DOCUMENTS 5,365,169 A 11/1994 Hosohara et al.
5,365,331 A 11/1994 Tamburrino et al.
5,371,363 A * 12/1994 Lilimpakis .................. 250/253
5,398,560 A * 3/1995 Zollingger et al. ........ 73/865.8
5,402,065 A 3/1995 Tabari et al.
5,453,688 A 9/1995 Cecco et al.
5,454,276 A * 10/1995 Wernicke ................... 73/865.8
5,461,312 A 10/1995 Hosohara et al.
5,461,313 A 10/1995 Bohon et al.
5,532,587 A 7/1996 Downs et al.
5,577,864 A * 11/1996 Wood et al. ............. 405/184.2
5,623,203 A 4/1997 Hosohara et al.
5,640,780 A 6/1997 Karmabon
5,675,251 A 10/1997 MacLean et al.
5,864,232 A * 1/1999 Laursen ...................... 324/220
6,087,830 A 7/2000 Brandley et al.
6,100,684 A * 8/2000 Ramaut ...................... 324/220
6,107,795 A * 8/2000 Smart ......................... 324/220
6,339,993 B1 * 1/2002 Comello et al. ........... 73/866.5
6,359,434 B1 3/2002 Winslow et al.
2002/0190682 A1 * 12/2002 Schempf et al. ....... 318/568.11
2003/0089267 A1 * 5/2003 Ghorbel et al. .......... 104/138.1

* cited by examiner

PIPE-INSPECTION SYSTEM

TECHNICAL FIELD OF THE INVENTION

The present invention relates to the field of pipe inspection. More specifically, the present invention relates to the field of pipe inspection by electronic means.

BACKGROUND OF THE INVENTION

Pipelines develop flaws over time. If left uncorrected, such flaws may eventually result in catastrophic failure of the pipeline. Such a catastrophic failure may result in lost services and revenues. Because a pipeline may fail without warning, early detection of flaws is fundamental to preventing catastrophic failure.

One method of inspection that has proven successful for pipelines in the field is the eddy-current technique. In the eddy-current technique, an electromagnetic field is induced within the pipeline. Flaws in the pipeline distort a component of this field. Analysis of these distortions locates and defines flaws in the pipeline.

In order to perform an in-field inspection, an electronic inspection system is passed through the pipeline under controlled conditions. The mechanics of passing an inspection system present several problems.

A problem exists in that many inspection systems contain components that are unable to negotiate sharp bends or junctions. These systems are therefore unsuitable for use with convoluted pipelines.

In addition, an inspection system that is unable to negotiate the bends and junctions in a pipeline is likely to become jammed in the pipeline. If a system becomes stuck within a pipeline, then the system itself becomes a "flaw" (i.e., a blockage) of the pipeline, necessitating repair.

Many inspection systems are configured to move in one direction only. Since any system may become stuck in the pipeline under a specific set of circumstances, there should be some way of backing the system out of the pipeline. Systems configured to move in only one direction are therefore undesirable.

Many inspection systems are constructed using materials that do support the growth of bacteria and/or fungi. Such systems may therefore be carriers of disease and parasites, and are therefore unsuitable where sanitary conditions must be maintained, as in a municipal water system or a food-processing facility.

Similarly, many inspection systems contain materials that pose a risk of contamination. For example, lubricants or materials that corrode or shed are inherently unsuitable for pipelines used in municipal water systems, or food- or chemical-processing facilities.

Conversely, many inspection systems contain materials that may be adversely affected by the normal-contents of the pipeline, i.e., the normal contents of the pipeline may corrode or degrade the materials of the system. A system with steel components, for example, would be entirely unsuitable for a pipeline that normally carries sulfuric acid.

Also, many inspection systems contain components, such as pull lines or housings, that may potentially damage the pipeline. For example, steel housings may scratch the inside of the pipeline, thereby producing potential future flaws.

An inspection system is limited in the length of pipeline inspected in one pass by its ability to move through the pipeline. A prime consideration in this area is friction. The easier a system can slip though the pipeline, the less friction it will generate. Heavy systems generate more friction than similar lightweight systems.

The negotiation of bends and junctions generates more friction than the negotiation of straight sections of pipeline. Cumbersome systems containing large components negotiate bends and junctions less readily than more streamlined systems with smaller components. Such cumbersome systems are therefore undesirable.

The material of which a system is made may have a severe effect upon the generated friction. Systems made of materials that exhibit a high frictional constant are therefore undesirable.

For inspection systems that are pulled through a pipeline by a towline, the towline may produce a significant amount of friction in and of itself. For example, it takes considerable force to simply drag a half-inch steel cable through a two-kilometer steel pipeline. In addition, the cable poses a significant hazard to the pipeline, especially at bends and junctions where the dragging of the cable may actually cut into the inner surface of the pipeline.

Similarly, an umbilical line is often used to power the electronic components of a system and bring out the resultant data. The umbilical line itself may generate significant friction. For example, a rubber- or neoprene-clad electrical cable may generate sufficient friction in a long run to break the cable.

SUMMARY OF THE INVENTION

Accordingly, it is an advantage of the present invention that a pipe-inspection system is provided.

It is another advantage of the present invention that a pipe-inspection system is provided that is compatible with eddy-current and other non-destructive examination techniques for inspection of a metallic pipeline.

It is another advantage of the present invention that a pipe-inspection system is provided that is configured to easily negotiate bends, junctions, and obstacles within the pipeline.

It is another advantage of the present invention that a pipe-inspection system is provided that is sanitary, non-contaminating, and non-damaging.

It is another advantage of the present invention that a pipe-inspection system is provided that is lightweight and fabricated of materials selected to reduce friction within the pipeline.

The above and other advantages of the present invention are carried out in one form a pipe-inspection system for the inspection of a pipeline. The system includes a plurality of wheeled guidance units, a transmission unit coupled between first and second ones of the wheeled guidance units, a reception unit coupled between second and third ones of the wheeled guidance units, a lead line coupled to the first wheeled guidance unit, and a trail line coupled to the fourth guidance unit.

The above and other advantages of the present invention are carried out in another form by a pipe-inspection system for the inspection of a pipeline. The system includes a transmission cluster-made up of a first wheeled guidance unit, a transmission unit, a second wheeled guidance unit, a first inter-unit connector coupled between the transmission unit and the first wheeled guidance unit, and a second inter-unit connector coupled between the transmission unit and the second wheeled guidance unit; a reception cluster made up of a third wheeled guidance unit, a reception unit, a fourth wheeled guidance unit, a third inter-unit connector coupled between the reception unit and the third wheeled guidance unit, and a fourth inter-unit connector coupled between the reception unit and the fourth wheeled guidance unit; an inter-cluster connector coupled between the transmission cluster and the reception cluster; a lead line coupled to the first wheeled guidance unit and configured to move the system through the pipeline in a forward direction; and a trail line coupled to the fourth wheeled guidance unit and configured to move the system through the pipeline in a reverse direction.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
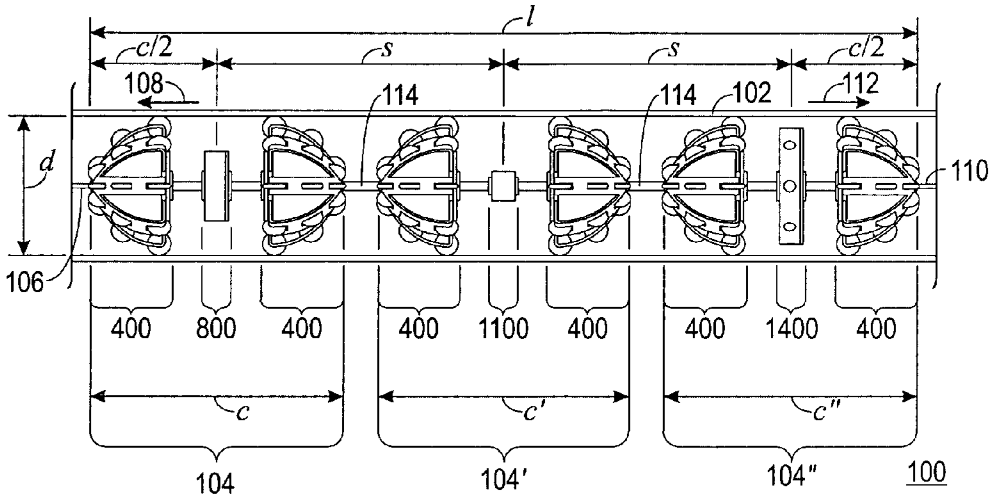
FIG. 1 shows a side view of a pipe-inspection system in use within a pipeline in accordance with a preferred embodiment of the present invention.

Throughout this discussion, items are assigned three- or four-digit reference numbers whose first digit (if three-digit) or first two digits (if four digit) reflect the Figure in which the item first appears. That is, items first appearing in FIG. 1 are assigned reference numbers between 100 and 199, etc. Once assigned, a given reference number is used in all Figures in which that item appears.

Figure 2:
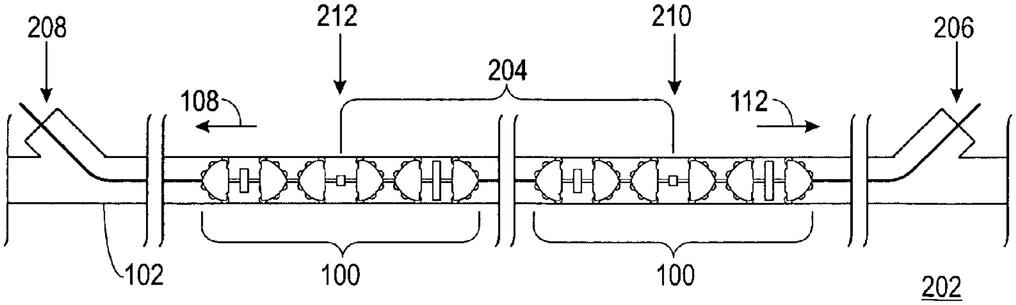
FIG. 2 shows a side view of a portion of a pipeline in which the pipe-inspection system of FIG. 1 is in use in accordance with a preferred embodiment of the present invention.
Figure 3:
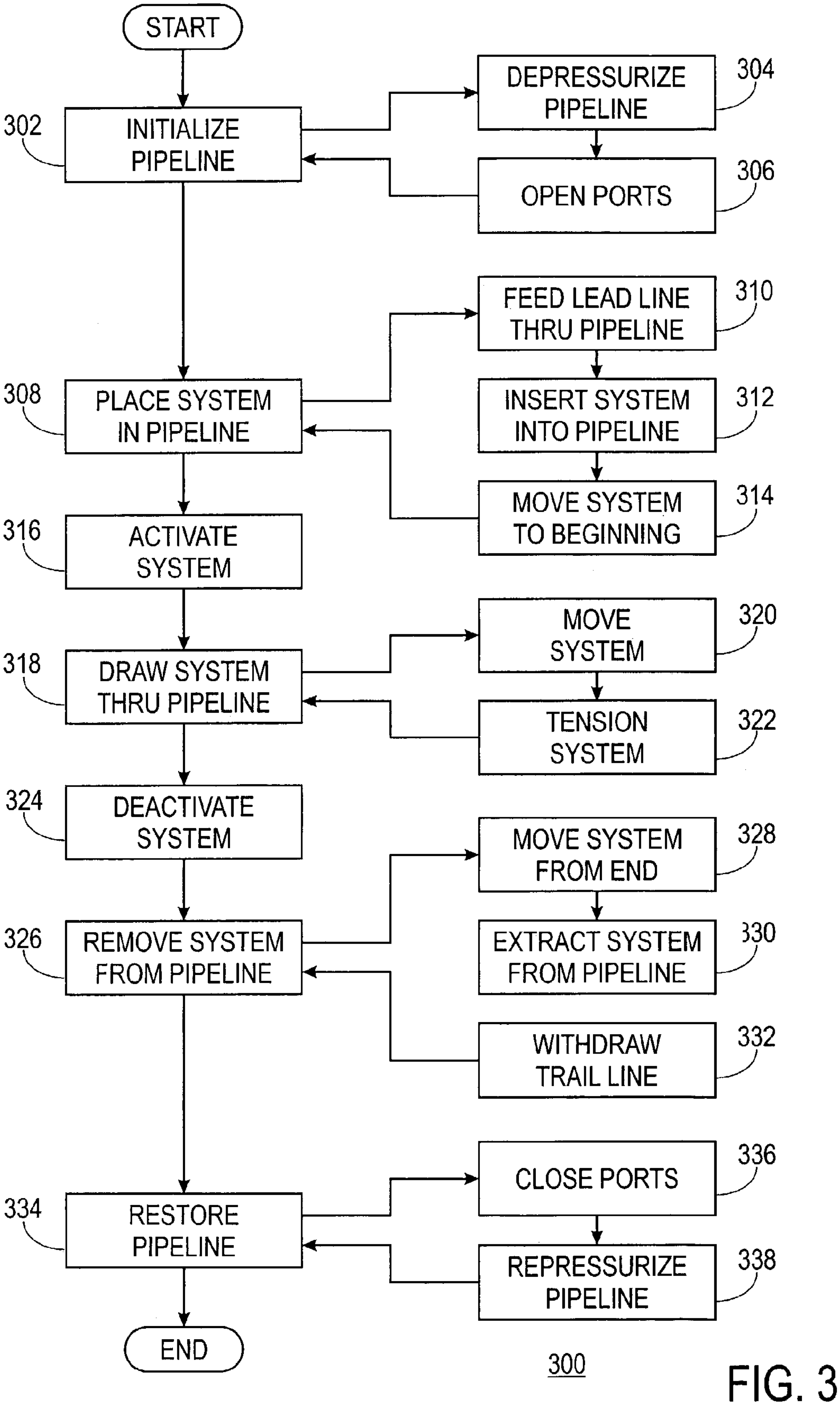
FIG. 3 shows a block diagram depicting a process for operation of the pipe-inspection system of FIG. 1 in accordance with a preferred embodiment of the present invention.

FIG. 1 shows a side view of a pipe-inspection system 100 in use within a pipeline 102, FIG. 2 shows a side view of a portion 202 of pipeline 102 in which pipe-inspection system 100 is in use, and FIG. 3 shows a block diagram depicting a process 300 for operation of pipe-inspection system 100 in accordance with a preferred embodiment of the present invention. The following discussion refers to FIGS. 1 through 3.

Pipe-inspection system 100 is made up of a transmission cluster 104 and a reception cluster 104". System 100 may also contain one or more intermediate clusters 104' between transmission cluster 104 and reception cluster 104".

A lead line 106 is coupled to transmission cluster 104. Lead line 106 serves to move system 100 through pipeline 102 in a forward direction 108. Similarly, a trail line 110 is coupled to reception cluster 104". Trail line 110 serves to provide tension to system 100 when lead line 106 is moving system 100 in forward direction 108, and serves to move system 100 in a reverse direction 112 upon need.

In process 300, a portion 202 of pipeline 102 encompassing a section 204 to be inspected is initialized in a subprocess 302. Pipeline portion 202 extends at least between an insertion port 206 and an extraction port 208.

In subprocess 302, pipeline portion 202 is depressurized in a task 304. Ports 206 and 208 are then opened in a task 306 to provide access to an interior of pipeline 102. When pipeline 102 carries a fluid, pipeline portion 202 may also be evacuated of that fluid. However this is not a requirement of the present invention, and is not shown in FIG. 2.

Once pipeline portion 202 has been initialized by subprocess 302, pipe-inspection system 100 is placed inside of pipeline 102 in a subprocess 308.

In subprocess 308, a lead line 106 is passed through pipeline portion 202 from insertion port 206 through extraction port 208 in a task 310. Lead line 106 may be passed through pipeline portion 202 by any of numerous conventional methods known to those skilled in the art.

System 100 is inserted into pipeline 102 in a task 312. System 100 is then moved to a beginning 210 of section 204 to be inspected by pulling upon lead line 106 at extraction port 208.

Once system 100 has been positioned at section beginning 210, system 100 is activated in a task 316.

Activated system 100 is then drawn through section 204 in a subprocess 318. To perform subprocess 318 and draw system 100 through section 204, lead line 106 is pulled at extraction port 208 in a task 320 to move system 100 in forward direction 108, and trail line 110 is substantially simultaneously pulled at insertion port 206 in a task 322 to provide tension to system 100. If section 204 is substantially straight and level, task 322 may be omitted.

Once activated system 100 has arrived at an end 212 of section 204, system 100 is deactivated in a task 324.

System 100 is then removed from pipeline 102 in a subprocess 326. In subprocess 326, system 100 is moved from section end 212 to extraction port 208 in a task 328 by pulling upon lead line 106 at extraction port 208. System 100 is then extracted from extraction port 208 in a task 330, and trail line 110 is withdrawn from pipeline 102 through extraction port 208 in a task 332.

In a subprocess 334, pipeline portion 202 is then restored or “de-initialized.” Ports 206 and 208 are closed in a task 336, and pipeline portion 202 is repressurized in a task 338 and restored to normal operation.

It will be appreciated that there are three forces involved in a movement of system 100 through pipeline 102. A forward force $F_F$ is applied to lead line 106 in forward direction 108, a reverse force $F_R$ is applied to trail line 110 in reverse direction 112, and a stopping force $F_S$ is applied to system 100 by friction within pipeline 102. Force $F_F$ tries to move system 100 in forward direction 108, force $F_R$ tries to move system 100 in reverse direction 112, and force $F_S$ tries to keep system 100 from moving. Therefore, to move system 100 in forward direction 108, $F_F > F_R + F_S$, and to move system 100 in reverse direction 112, $F_R > F_F + F_S$.

Those skilled in the art will appreciate that the scenario described hereinbefore for pipe-inspection process 300 is but one of a plurality of processes varying in detail but not in substance. The use of a variant pipe-inspection process does not depart from the spirit of the present invention.

Pipe-inspection system 100 is fitted to a specific size pipe. That is, for different diameter pipes, different-sized systems 100 are used. System 100 is intended for larger pipelines 102.

Pipeline 102 has an inner diameter d, where $d \geqq 15$ cm. Because a given system 100 is fitted to a specific size of pipeline 102, sizes of components of system 100 are defined relative to pipeline inner diameter d. In this discussion, component dimensions for the preferred embodiment are given as a range and desirably a value relative to pipeline inner diameter d. The range is valid for pipelines larger than 15 cm (6 inches), i.e., where $d \geqq 15$ cm, and the desirable value is valid for a 30 cm (12-inch) pipeline, i.e., where d=30 cm.

Figure 4:
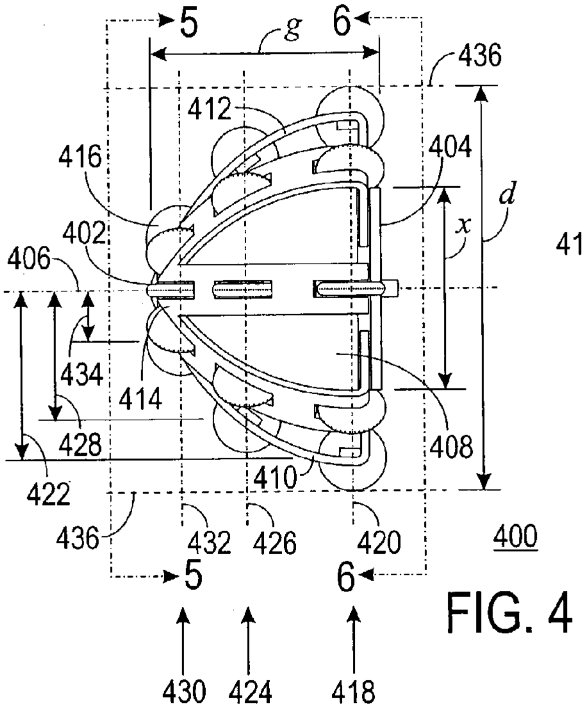
FIG. 4 shows a side view of a wheeled guidance unit of the pipe-inspection system of FIG. 1 in accordance, with a preferred embodiment of the present invention.
Figure 5:
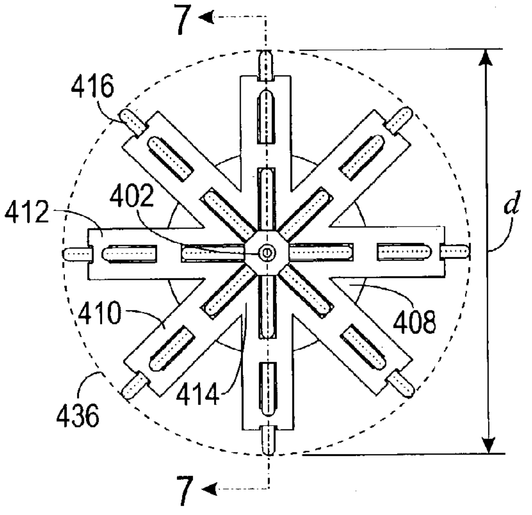
FIG. 5 shows an end view of the wheeled guidance unit of FIG. 4 taken at a line 5—5 of FIG. 4 in accordance with a preferred embodiment of the present invention.
Figure 6:
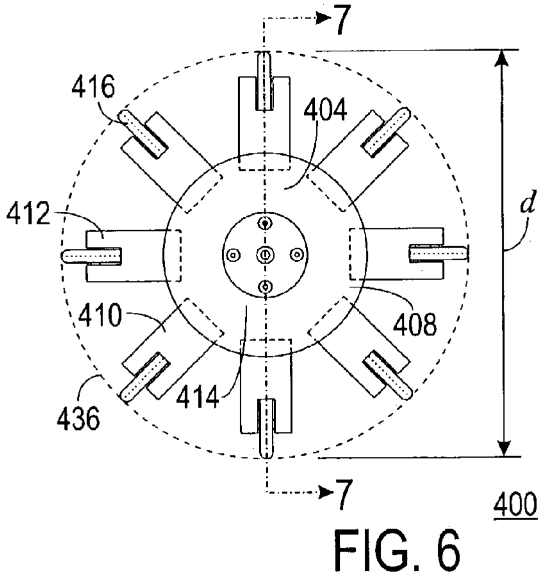
FIG. 6 shows an end view of the wheeled guidance unit of FIG. 4 taken at a line 6—6 of FIG. 4 in accordance with a preferred embodiment of the present invention.
Figure 7:
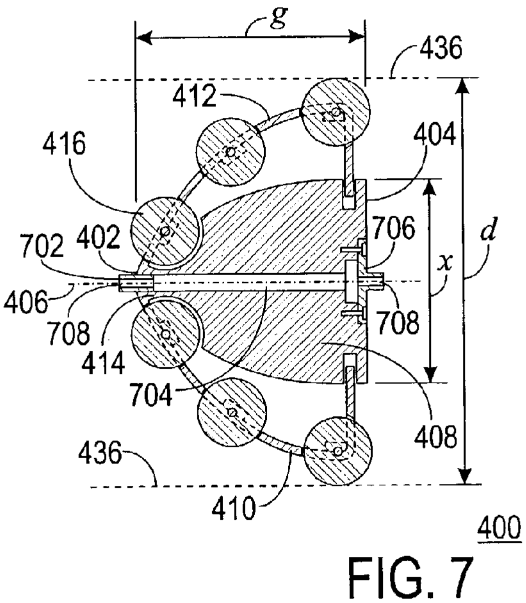
FIG. 7 shows a cross-sectional side view of the wheeled guidance unit of FIG. 4 taken at lines 7—7 of FIGS. 5 and 6 in accordance with a preferred embodiment of the present invention.

FIGS. 4, 5, 6, and 7 show a wheeled guidance unit 400 of pipe-inspection system, wherein FIG. 4 shows a side view, FIG. 5 shows an end view taken at a line 5—5, FIG. 6 shows an end view taken at a line 6—6, and FIG. 7 shows a cross-sectional side view taken at lines 7—7 in accordance with a preferred embodiment of the present invention. The following discussion refers to FIGS. 1, 4, 5, 6, and 7.

Each of transmission, intermediate, and reception clusters 104, 104', and 104" within pipe-inspection system 100 contains two wheeled guidance units 400. The interrelationship of components of clusters 104, 104', and 104" are discussed in more detail hereinafter in conjunction with FIGS. 17, 18, and 19.

Each wheeled guidance unit 400, when centered within pipeline 102, has an effective diameter that is substantially equal to pipeline inner diameter d.

Guidance units 400 are shaped as apico-conicoids with wheels. In the preferred embodiment, guidance units 400 are apices of right conicoids having ellipsoidal sides and flat bases. Those skilled in the art will appreciate, however, that this is not a requirement of the present invention.

Each guidance unit 400, being conicoid, has an apex 402 and a base 404, with an axis 406 extending from apex 402 to base 404. In the preferred embodiment, axis 406 is substantially perpendicular to base 404.

Each guidance unit 400 is substantially identical and desirably has a guidance-unit length g, being a distance between apex 402 and base 404 along axis 406. In the preferred embodiment, $0.45d \leqq g \leqq 0.75d$ and desirably g=0.56d.

Each guidance unit is formed of a core 408 and a wheel-support cage 410 surrounding core 408. Core 408 desirably has the same basic conicoid shape as the overall guidance unit 400, though decreased in size.

Base 404 is a base of transmission-unit core 408. Base 404, and hence core 408, has a diameter x. In the preferred embodiment, $0.4d \leqq x \leqq 0.6d$ and desirably x=0.5d.

Those skilled in the art will appreciate that the actual dimensions of core 408 are not relevant to the present invention as long as core 408 is smaller than wheel support cage 410. That is, core 408 may be slightly smaller or much smaller than wheel support cage 410 without affecting the operation of system 100.

Wheel support cage 410 is formed of more than four wheel-support straps 412. In the preferred embodiment, there are eight wheel-support straps 412, though it will be appreciated that this is not a requirement of the present invention.

Wheel support straps 412 are fused together proximate apex 402 to form a nose cone 414. Nose cone 414 is in turn fused to core 408. This fusing may be accomplished by heat or, as in the preferred embodiment, by chemical agent. In practical terms, this fusing renders core 408 and wheel support cage 410, i.e., wheel support straps 412 and nosecone 414, into a single piece of material.

Those skilled in the art will appreciate that there are other viable means of joining core 408 and the components of cage 410. The use of one of these other viable means does not depart from the spirit of the present invention.

Wheel support straps 412 each support at least one wheel 416 at some radial distance from axis 406 so that wheel support cage 410 has at least two wheels 416 at a first radial distance from axis 406 and at least two wheels 416 at a second radial distance from axis 406.

In the preferred embodiment, each wheel support strap 412 supports three wheels 416 at differing distances from axis 406. All wheel support straps 412 are substantially identical. Therefore, each wheeled guidance unit 400 in the preferred embodiment has three tiers of eight wheels 416 each, with each wheel 416 in a given tier residing in a wheel plane at a given radial distance from axis 406. In a first (outer) wheel tier 418, the eight wheels 416 reside in a first (outer) wheel plane 420 at a first (outer) radial distance 422. In a second (intermediate) wheel tier 424, the eight wheels 416 reside in a second (intermediate) wheel plane 426 at a second (intermediate) radial distance 428. In a third (inner) wheel tier 430, the eight wheels 416 reside in a third (inner) wheel plane 432 at a third (inner) radial distance 434. This results in wheeled guidance unit 400 having a plurality of wheels 416 distributed over its conicoid surface.

When guidance unit 400 is coaxial with pipeline 102, i.e., when axis 406 is substantially parallel to and substantially centered within pipeline 102, all of wheels 416 in outer tier 418 contact an inner surface 436 of pipeline 102. None of wheels 416 in either intermediate tier 424 or inner tier 430 contact inner surface 436 when guidance unit 400 is coaxial.

Those skilled in the art will appreciate that the ordering of wheels 416 over the conicoid surface of guidance unit 400 discussed hereinbefore is but one of many ways in which wheels 416 may be ordered. It is a requirement of the present invention that each guidance unit 400 be configured so that at least two wheels 416 contact inner surface 436 of pipeline 102 at all times. Other than this limitation, the use of other ordering schemes, including but not limited to random ordering, does not depart from the spirit of the present invention.

Each of transmission, intermediate, and reception clusters 104, 104', and 104" within pipe-inspection system 100 contains two wheeled guidance units 400. The leading guidance unit 400 is connected to lead line 106, and the trailing guidance unit 400 is connected to trail line 110. Inside of guidance cluster 400 is a chamber 704 configured to receive and retain either lead line 106 or trail line 110 in a manner described hereinafter.

Each of the remaining four guidance units 400 in cluster 104, 104', or 104" not connected to either lead line 106 or trail line 110 may have a connection plug 702 installed in chamber 704 at apex 402. Connecting plug 702 allows a guidance unit 400 to be coupled to another guidance unit 400 in a manner described hereinafter.

Guidance unit 400 has a connector 706 affixed to base 704. Connector 706 allows guidance unit 400 to be coupled to other units to form clusters 104, 104', and 104" in a manner described hereinafter in conjunction with FIGS. 17, 18, and 19.

A passage 708 passes from chamber 704 to an outside of guidance unit 400 through connecting plug 702 and connector 706. Passage 708 may provide a path for an electrical cable (not shown) to pass into or through guidance unit 400.

Figure 8:
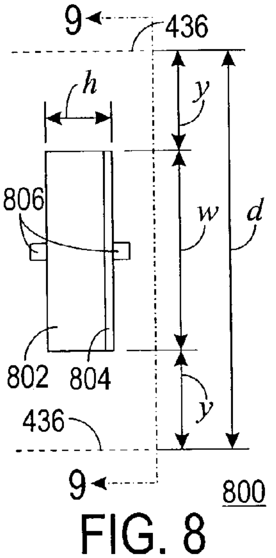
FIG. 8 shows a side view of a transmission unit of the pipe-inspection system of FIG. 1 in accordance with a preferred embodiment of the present invention.
Figure 9:
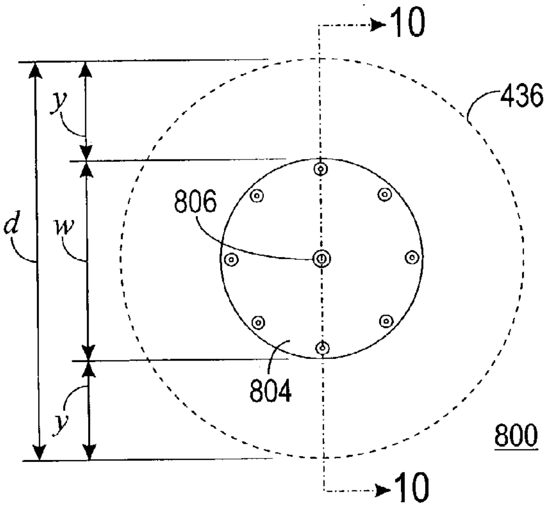
FIG. 9 shows an end view of the transmission unit of FIG. 8 taken at a line 9—9 of FIG. 8 in accordance with a preferred embodiment of the present invention.
Figure 10:
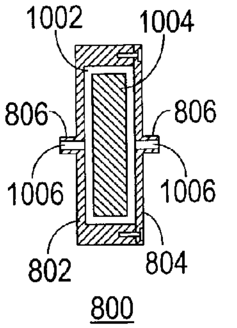
FIG. 10 shows a cross-sectional side view of the transmission unit of FIG. 8 taken at a line 10—10 of FIG. 9 in accordance with a preferred embodiment of the present invention.
Figure 11:
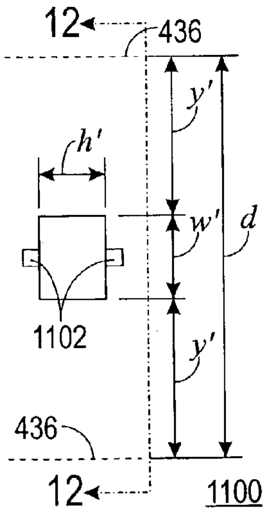
FIG. 11 shows a side view of an intermediate unit of the pipe-inspection system of FIG. 1 in accordance with a preferred embodiment of the present invention.
Figure 12:
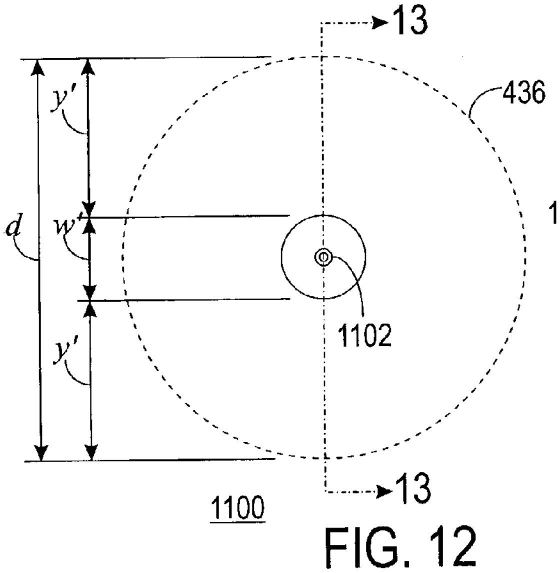
FIG. 12 shows an end view of the intermediate unit of FIG. 11 taken at a line 12—12 of FIG. 11 in accordance with a preferred embodiment of the present invention.
Figure 13:
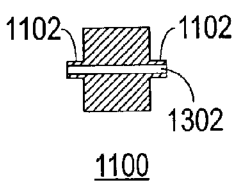
FIG. 13 shows a cross-sectional side view of the intermediate unit of FIG. 11 taken at a line 13—13 of FIG. 12 in accordance with a preferred embodiment of the present invention.
Figure 14:
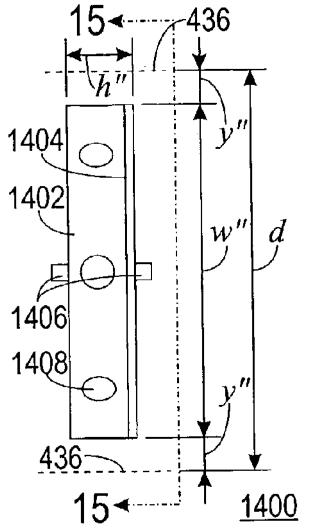
FIG. 14 shows a side view of a reception unit of the pipe-inspection system of FIG. 1 in accordance with a preferred embodiment of the present invention.
Figure 15:
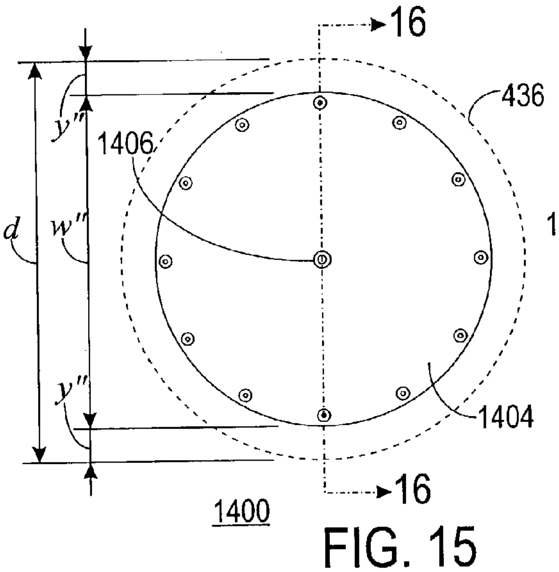
FIG. 15 shows an end view of the reception unit of FIG. 14 taken at a line 15—15 of FIG. 14 in accordance with a preferred embodiment of the present invention.
Figure 16:
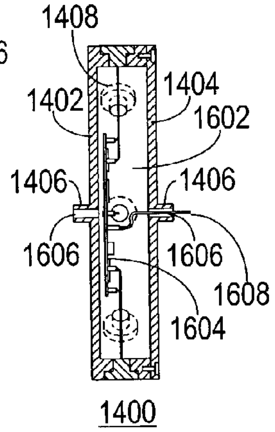
FIG. 16 shows a cross-sectional side view of the reception unit of FIG. 14 taken at a line 16—16 of FIG. 15 in accordance with a preferred embodiment of the present invention.

FIGS. 8, 9, and 10 show a transmission unit 800, FIGS. 11, 12, and 13 show an intermediate unit 1100, and FIGS. 14, 15, and 16 show a reception unit 1400, wherein FIGS. 8, 11, and 14 show side views, FIGS. 9, 12, and 15 show end views taken at lines 9—9, 12—12, and 15—15, respectively, and FIGS. 10, 13, and 16 show cross-sectional side views taken at lines 10—10, 13—13, and 16—16, respectively, in accordance with a preferred embodiment of the present invention. The following discussion refers to FIGS. 1, 8, 9, 10, 11, 12, 13, 14, 15, and 16.

Each of transmission, intermediate, and reception clusters 104, 104', and 104" within pipe-inspection system 100 contains one of transmission unit 800, intermediate unit 1100, or reception unit 1400, respectively. The interrelationship of components of clusters 104, 104', and 104" are discussed in more detail hereinafter in conjunction with FIGS. 17, 18, and 19.

Transmission reception unit 800 has a length h. In the preferred embodiment, $0.1d \leqq h \leqq 0.3d$ and desirably $h=0.17d$. Transmission unit 800 is shorter than guidance unit 400, i.e., $h<g$.

Transmission unit 800 (FIGS. 8, 9, and 10) is preferably cylindrical and has a diameter w, which is less than pipeline inner diameter d. In the preferred embodiment, $0.4d \leqq w \leqq 0.6d$ and desirably $w=0.5d$.

When transmission cluster 104 is substantially coaxial with pipeline 102, transmission unit 800 is separated from pipeline inner surface 436 by a clearance y, where $y=0.5(d-w)$, i.e., $0.3d \geqq y \geqq 0.2d$ and desirably $y=0.25d$.

Transmission unit 800 is desirably formed as a box having a body 802, a cover 804, and a pair of connectors 806. Body 802 and cover 806 enclose an interior space 1002. Within interior space 1002 resides a transmission device 1004. Transmission device may be a magnet, an electromagnet, or other transmission circuitry. In the preferred embodiment, transmission device is a remote-field eddy-current (RFEC) transmitter.

Transmission unit 800 has two passages 1006 passing from interior space 1002 to the outside through connectors 806.

Intermediate unit 1100 has length h'. In the preferred embodiment, intermediate-unit length h' is substantially identical to transmission unit length h. That is, $0.1d \leqq h' \leqq 0.3d$ and desirably $h'=0.17d$. Intermediate unit 1100 is shorter than guidance unit 400, i.e., $h'<g$.

Intermediate unit 1100 (FIGS. 11, 12, and 13) serves as a spacer having a length h'. Intermediate unit 1100 is preferably cylindrical and has a diameter w', where w' is less than pipeline inner diameter d and preferably less than transmission-unit diameter w. In the preferred embodiment, $0.1d \leqq w' \leqq 0.25d$ and desirably $w'=0.2d$.

When intermediate cluster 104' is substantially coaxial with pipeline 102, intermediate unit 1100 is separated from pipeline inner surface 436 by a clearance y', where $y'=0.5(d-w')$, i.e., $0.45d \geqq y' \geqq 0.38d$ and desirably $y'=0.4d$.

Those skilled in the art will appreciate that since intermediate unit 1100 serves as a spacer, the actual diameter w' and clearance y' of intermediate unit 1100 are not a requirement of the present invention. Values for diameter w' and clearance y' other than those indicated herein may be used without departing from the spirit of the present invention.

Reception unit 1400 has length h". In the preferred embodiment, reception-unit length h" is substantially identical to transmission unit length h. That is, $0.1d \leqq h'' \leqq 0.3d$ and desirably $h''=0.17d$. Reception unit 1400 is shorter than guidance unit 400, i.e., $h''<g$.

Reception unit 1400 (FIGS. 14, 15, and 16) is preferably cylindrical and has a diameter w", which is less than the inner diameter d of pipeline 102. In the preferred embodiment, 0.75d≦w≦0.9d and desirably w=0.83d.

When reception cluster 104" is substantially coaxial with pipeline 102, reception unit 1400 is separated from inner surface 436 of pipeline 102 by a clearance y", where y"=0.5(d−w'), i.e., 0.125d≧y"≧0.05d and desirably y"=0.875d.

Reception unit 1400 is desirably formed as a box having a body 1402 and a cover 1404. Embedded within body 1402 is a plurality of sensors 1406 (assuming RFEC or similar inspection techniques). Within reception unit 1400 resides reception circuitry 1602.

Reception unit 1400 is desirably formed as a box having a body 1402, a cover 1404, and a pair of connectors 1406. Body 1402 and cover 1406 enclose an interior space 1602. Within interior space 1602 resides a reception device 1604. Reception device may be an appropriate reception circuitry. In the preferred embodiment, a plurality of RFEC sensors 1408 are embedded within body 1402, and reception device 1604 is an RFEC receiver.

Reception unit 1400 has two passages 1606 passing from interior space 1602 to the outside through connectors 1406. An electronic cable 1608 from reception device 1604 passes through one of passages 1606.

Figure 17:
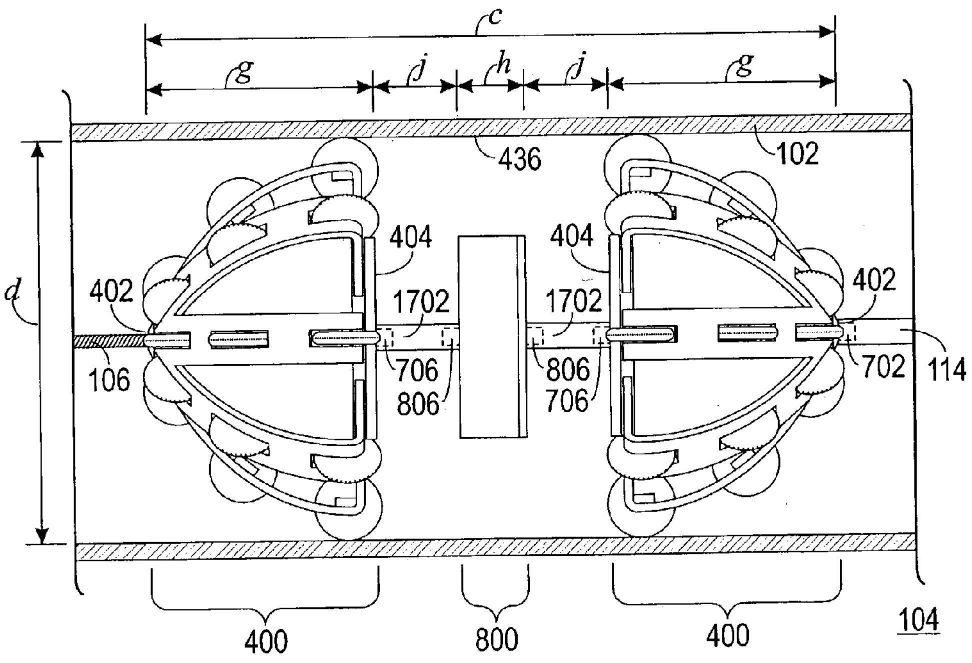
FIG. 17 shows a side view of a transmission cluster of the pipe-inspection system of FIG. 1 within a pipe in accordance with a preferred embodiment of the present invention.
Figure 18:
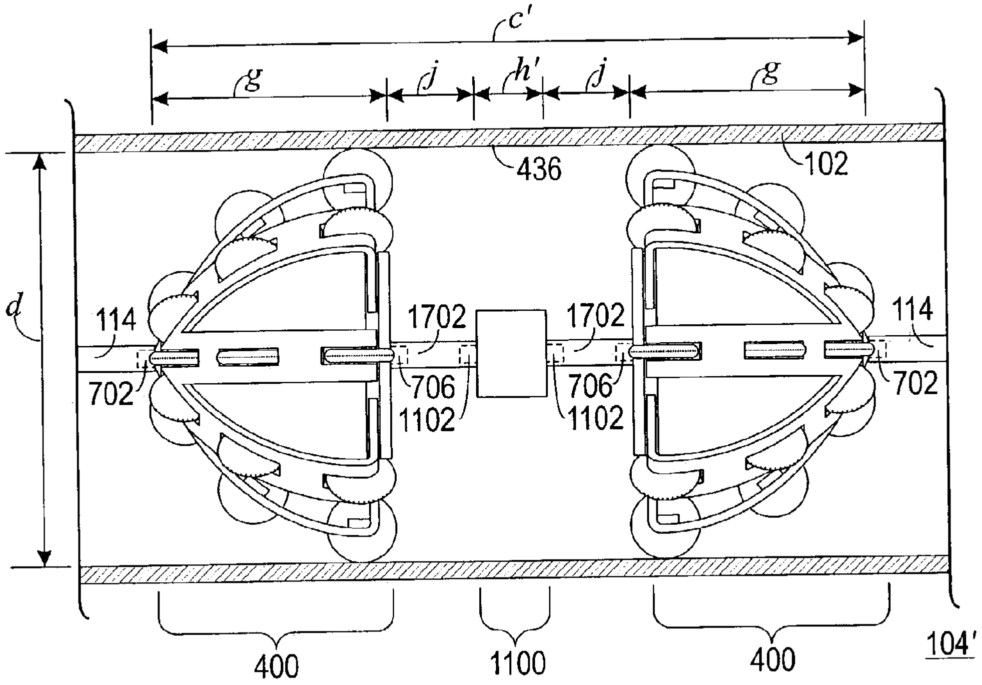
FIG. 18 shows a side view of an intermediate cluster of the pipe-inspection system of FIG. 1 within a pipe in accordance with a preferred embodiment of the present invention.
Figure 19:
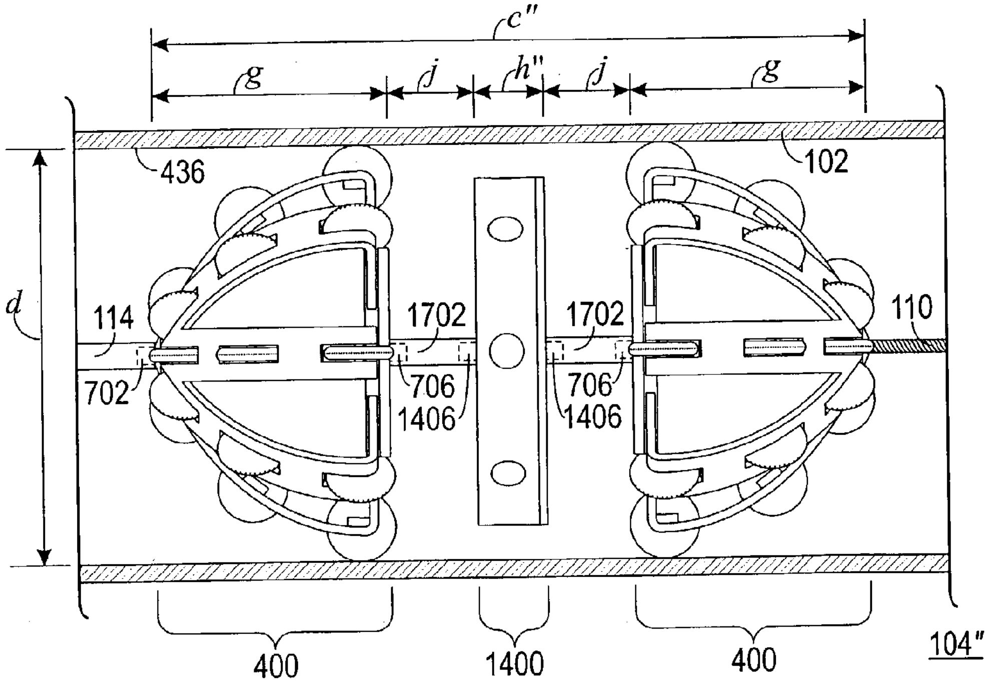
FIG. 19 shows a side view of a reception cluster of the pipe-inspection system of FIG. 1 within a pipeline in accordance with a preferred embodiment of the present invention.

FIG. 17 shows a side view of transmission cluster 104, FIG. 18 shows a side view of intermediate cluster 104', and FIG. 19 shows a side view of reception cluster 104" of pipe-inspection system 100 within pipeline 102 in accordance with a preferred embodiment of the present invention. The following discussion refers to FIGS. 1, 17, 18 and 19.

Pipe-inspection system 100 is made up of a plurality of clusters 104, 104', and 104" connected in series. Each of clusters 104, 104', and 104" is made up of a forward-facing wheeled guidance unit 400, a respective one of transmission, intermediate, and reception units 800, 1100, and 1400, and a backward-facing wheeled guidance unit 400.

For forward guidance unit 400, apex 402 is in forward direction 108 relative to base 404. For backward guidance unit 400, apex 402 is in reverse direction 110 relative to base 404. That is, bases 404 face each other over transmission, intermediate, or reception unit 800, 1100, or 1400.

Within each cluster 104, 104', and 104", flexible inter-unit connectors 1702 couple the two guidance units 400 to a respective and centrally located transmission, intermediate, or reception unit 800, 1100, or 1400. For purposes of this discussion, the term "flexible connector" is assumed to include "articulated connector," "jointed connector," "Cardan joint," etc. The form of inter-unit connectors 1702 is not germane to the spirit of the present invention.

In one embodiment, inter-unit connector may be a flexible hollow tube, where one end of each inter-unit connector 1702 slips over guidance-unit connector 706 and the other end slips over a corresponding transmission-unit connector 806, intermediate-unit connector 1106, or reception-unit connector 1406. The ends of inter-unit connectors 1702 may be held in place by bonding, clamping, or other means well known to those skilled in the art.

Inter-unit connector 1702 desirably provides a spacing j between units, where inter-unit spacing j is configured to allow the cluster 104, 104', or 104" to negotiate 90° turns without becoming stuck. In the preferred embodiment, 0.2d≦j≦0.3d and desirably j=0.25d. Like transmission-unit length h, inter-unit spacing j is shorter than guidance-unit length g, i.e., j<g.

Transmission cluster 104 is made up of two guidance units 400, two inter-unit connectors 1702, and one transmission unit 800. Transmission cluster 104 has a length c that is a sum of the lengths of its components. That is, c=2g+2j+h. In the preferred embodiment, 1.4d≦c≦2.4d and desirably c=1.79d.

Similarly, intermediate cluster 104' is made up of two guidance units 400, two inter-unit connectors 1702, and one intermediate unit 1100. Intermediate cluster 104 has a length c' that is a sum of the lengths of its components. That is, c'=2g+2j+h'. In the preferred embodiment, intermediate-unit length h' is substantially equal to transmission-unit length h. That is, h'=h. Therefore, 1.4d≦c'≦2.4d and desirably c'=1.79d.

Again, reception cluster 104" is made up of two guidance units 400, two inter-unit connectors 1702, and one reception unit 1400. Reception cluster 104 has a length c" that is a sum of the lengths of its components. That is, c"=2g+2j+h". In the preferred embodiment, reception-unit length h" is substantially equal to transmission-unit length h. That is, h"=h. Therefore, 1.4d≦c"≦2.4d and desirably c"=1.79d.

Pipe-inspection system 100 is desirably made up of one transmission cluster 104, one intermediate cluster 104', and one reception cluster 104". Clusters 104, 104', and 104" are serially connected by inter-cluster connectors 114. Inter-cluster connectors 114 are configured to produce a center-to-center cluster spacing s so as to maintain appropriate flexibility in system 100. In the preferred embodiment, 1.9d≦s≦2.2d and desirably s=2.04d. The three clusters 104, 104', and 104" produce an overall system length l substantially equal to twice cluster spacing s plus cluster length c, i.e., l=2s+c. In the preferred embodiment, 5.2d≦l≦7.0d, and desirably l=5.88d.

Figure 26:
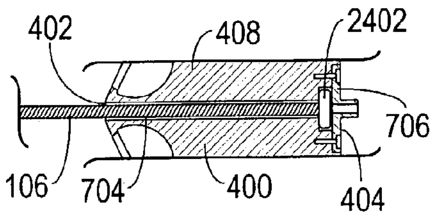
FIG. 26 shows an attachment of the lead line of FIG. 24 to a core of the guidance unit of FIG. 4 in accordance with a preferred embodiment of the present invention.

Pipe-inspection system 100 contains lead line 106 and trail line 110. Lead line 106 is coupled to the forward-facing guidance unit 400 of transmission cluster 104, and trail line 110 is coupled to the backward-facing guidance unit 400 of reception cluster 104". The preferred manner of connecting lead and trail lines 106 and 110 to clusters 104 and 104" is discussed hereinafter in connection with FIGS. 24 through 26.

Figure 20:
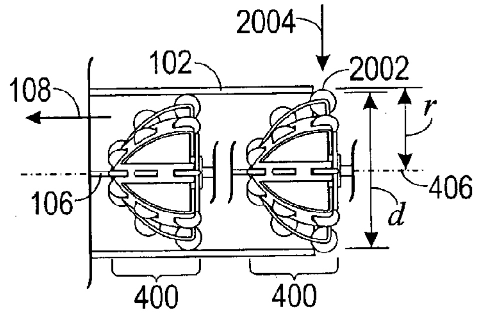
FIG. 20 shows a side view of a guidance unit of the pipe-inspection system of FIG. 1 effecting entrance into a pipeline in accordance with a preferred embodiment of the present invention.

FIG. 20 shows a side view of guidance unit 400 effecting entrance into pipeline 102 in accordance with a preferred embodiment of the present invention. The following discussion refers to FIGS. 1, 4, 17, and 20.

The hereinbefore discussion of the structure of wheeled guidance unit 400 presumed that guidance unit 400 was located inside pipeline 102.

Wheel support straps 412 have a degree of springiness. Wheel support straps 412 are desirably configured so that, when guidance unit 400 is not within pipeline 102, an outermost point 2002 on each wheel 416 of outer tier 418 has a radial distance r relative to axis 406 that is greater than half the inner diameter d of pipeline 102, i.e., where r>d/2. When inserted into pipeline 102, therefore, each wheel 416 of outermost tier 418 must be compressed slightly in a direction 2004 towards axis 406 as guidance unit is moved in forward direction 108. The result is that wheels 416 in outer tier 418 exert a force against inner surface 436 of pipeline 102. This pressure serves to center and align each guidance unit 400 during the inspection of pipeline 102.

Figure 21:
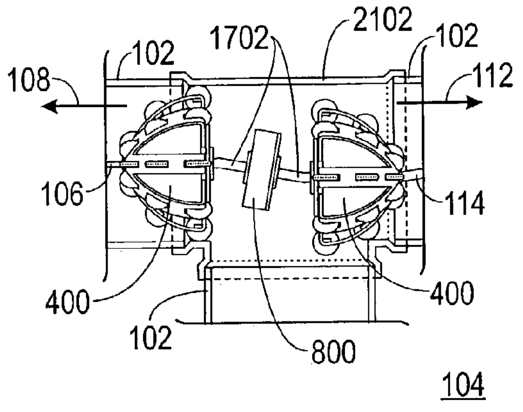
FIG. 21 shows a side view of a transmission cluster of the pipe-inspection system of FIG. 1 negotiating a through passage of a downdropping tee in accordance with a preferred embodiment of the present invention.

FIG. 21 shows a side view of transmission cluster 104 of pipe-inspection system 100 negotiating a through passage of a downdropping Tee 2102 in accordance with a preferred embodiment of the present invention. The following discussion refers to FIGS. 1, 4, 17, and 21.

Core 408 of each guidance unit 400 has a passage 704 along axis 406. In transmission guidance cluster 104, lead line 106 enters forward-facing guidance unit 400 substantially at apex 402, passes through passage 704, and is coupled inside guidance unit 400 proximate base 404. In this manner, a force applied to lead line 106 pushes, rather than pulls, forward-facing guidance unit 400 in forward direction 108, while simultaneously guiding apex 402 around bends and through junctions.

Transmission cluster 104 is depicted as traversing a through passage of downdropping Tee 2102. As forward-facing guidance unit 400 is pushed into Tee 2102, it sags into the downdrop, but is kept aligned by the apical guidance of lead line 106. As it reaches the opposite side of the downdrop, wheels 416 of intermediate tier 430 engage Tee 2102, lead line 106 guides leading guidance unit 400' upward, and wheels 416 of outer tier 418 enter and engage pipeline 102.

Figure 22:
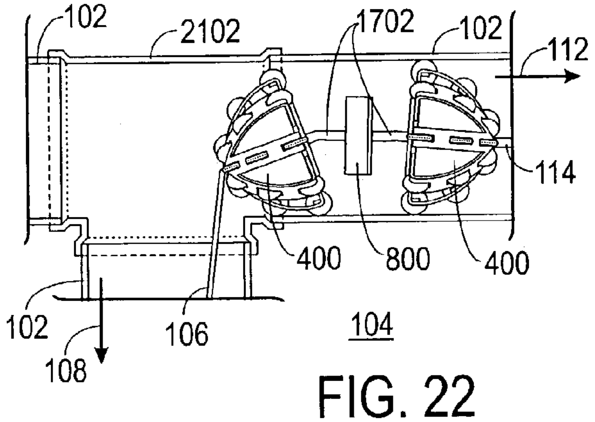
FIG. 22 shows a side view of a transmission cluster of the pipe-inspection system of FIG. 1 beginning negotiation of a corner passage of a downdropping Tee in accordance with a preferred embodiment of the present invention.
Figure 23:
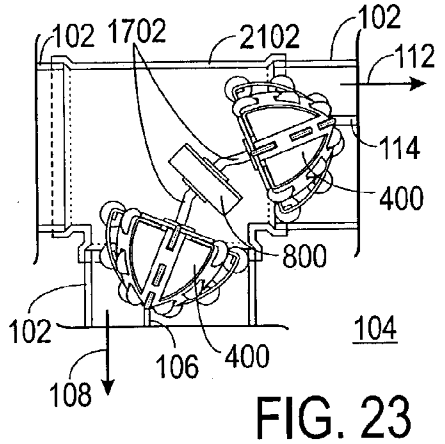
FIG. 23 shows a side view of the guidance cluster of FIG. 22 continuing negotiation of a corner passage of a downdropping Tee in accordance with a preferred embodiment of the present invention.

FIGS. 22 and 23 show side views of transmission cluster 104 of pipe-inspection system 100 beginning (FIG. 22) and continuing (FIG. 23) negotiation of a corner passage of downdropping Tee 2102 in accordance with a preferred embodiment of the present invention. The following discussion refers to FIGS. 1, 4, 17, 22, and 23.

In a similar manner, lead line 106 pushes and guides transmission cluster 104 around bends and corners. Transmission cluster 104 negotiates a substantially 90° corner within downdropping Tee 2102. As forward-facing guidance unit 400 is pushed into Tee 2102, lead line 106 guides apex 402 downward, and wheels 416 first of intermediate tier 424, then of inner tier 430 engage horizontal passage of Tee 2102. As forward-facing guidance unit 400 reaches the corner, it pivots and wheels 416 first of inner tier 430, then of intermediate tier 424, and finally of outer tier 418 engage downward portion of Tee 2102. Simultaneously, the tilting of leading guidance unit 400' lifts transmission unit 800 and tilts backward-facing guidance unit 400, thereby causing transmission unit 800 and backward-facing guidance unit 400 to track around the corner after forward-facing guidance unit 400.

It will be noted here that transmission unit 800 approaches the corner of Tee 2102. For this reason, transmission unit 800 is preferably cylindrical and is configured to inhibit transmission unit from striking and/or becoming hung up upon the corner of downdropping Tee 2102 as cluster 104 negotiates the turn.

Intermediate cluster 104' is coupled to transmission cluster 104 by inter-cluster connector 114. This causes forward-facing guidance unit 400 of intermediate cluster 104' to tilt and track backward-facing guidance unit 400 of transmission cluster 104. This in turn guides intermediate cluster around the corner. Similarly, reception cluster 104" tracks and is guided by intermediate cluster 104'.

Those skilled in the art will appreciate that a shape other than a cylinder may be used for transmission, intermediate, and reception units 800, 1100, and 1400 as long as the unit is configured to inhibit hanging up when negotiates a 90° corner. The use of an alternative shape does not depart from the spirit of the present invention.

In reception guidance cluster 104", trail line 110 enters backward-facing guidance unit 400 substantially at apex 402, passes trough passage 704, and is coupled inside guidance unit 400 proximate base 404. In this manner, a force applied to lead line 106 pushes, rather than pulls, forward-facing guidance unit 400 in forward direction 108, while simultaneously guiding apex 402 around bends and through junctions. When, because of jamming, shifts in pipe size, or other condition, it becomes necessary for system 100 to move in reverse direction 112, trail line 110 serves exactly as does lead line 106 for forward direction 108.

The following discussion refers to FIGS. 1, 7, 10, 13, and 16.

The components of each guidance unit 400 (core 408, wheel support straps 412, and wheels 416), of transmission unit 800, (body 802 and lid 804), of intermediate unit 1100, and of reception unit 1400 (body 1402 and lid 1404) are desirably made of a sanitary, non-contaminating, lightweight material. Desirably, this material is a polymeric material. In the preferred embodiment, this material is high-density polyethylene.

Similarly, lead line 106 and trail line 110 are also formed of a strong, sanitary, non-contaminating, lightweight material. In the preferred embodiment, lead and trail lines 106 and 110 are essentially ⅜-inch AmSteel™ 12-strand braided ropes by Samson Rope Technologies, Inc., which are formed of DYNEEMA®, a high-molecular-density, ultra-high-strength polyethylene fiber from Toyobo Co., Ltd, of Japan. A ⅜-inch AmSteel™ rope has an average tensile strength of 6400 KG (14,100 lbs.).

By forming essentially all components of a sanitary material, i.e., a material upon which bacteria and fungi will not grow, pipe-inspection system is made suitable for municipal water system, food handling systems, etc. By forming essentially all components of a non-contaminating material, i.e., a material that does not readily combine with other materials, system 100 is made suitable for use in any pipeline where contamination and/or system (chemical) breakdown would be detrimental. By forming essentially all components of a slick, non-abrasive material, potential damage to the pipeline is minimized while ease of passage is maximized.

The use of lightweight materials is desirable to minimized friction. Desirably, materials for system 100 are chosen so that the entirety of system 100, including lead line 106 and trail line 110 but excluding any transmission or reception devices 1004 and 1604, will have an overall density of less than 1.0 g/cm$^3$ (i.e., system 100 will float). This significantly reduces friction between system 100 and pipeline 102. When constructed of the materials of the preferred embodiment, the entirety of system 100 configured for a 30.5-cm (12-inch) pipeline may have a mass of less than 50 kg.

By forming lead line 106 and trail line 110 of a strong polymeric material, such as DYNEEMA®, system 100 may be configured for long pipeline runs. Using the ⅜-inch AmSteel™ of the preferred embodiment, system 100 may be used to inspect a section of 30.5-cm pipeline in excess of 2.1 km (7000 ft.).

Figure 24:
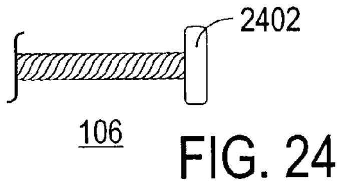
FIG. 24 shows a side view of a portion of a lead line of the pipe-inspection system of FIG. 1 demonstrating an integrally formed head in accordance with a preferred embodiment of the present invention.
Figure 25:
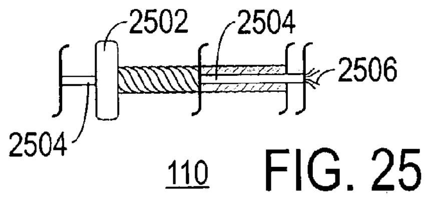
FIG. 25 shows a partially cutaway side view of a trail line of the pipe-inspection system of FIG. 1 in accordance with a preferred embodiment of the present invention.

FIGS. 24 and 25 show side views of a portion of lead line 106 (FIG. 24) and trail line 110 (FIG. 25) of pipe-inspection system 100 demonstrating an integrally formed head 2402, and FIG. 25 shows an attachment of lead line 106 to core 408 of guidance unit 400 in accordance with a preferred embodiment of the present invention. The following discussion refers to FIGS. 1, 7, 17, 19, 24, 25, and 26.

When using a slick polymeric material, such as DYNEEMA®, for lead and trail lines 106 and 110, certain unconventionalities are imposed. A rope of such a material does not hold a knot well. Therefore, other methods may be found to secure lead line 100 to forward-facing guidance unit 400 of transmission cluster 104, and to secure trail line 110 to backward-facing guidance unit 400 of reception cluster 104".

In the preferred embodiment, lead line 106 is passed through passage 704 of a guidance unit 400 with connector 706 removed. A portion of lead line 106 is then melted and shaped to form a head 2402. Head 2402 prevents lead line 106 from passing back through passage 704. Connector 706 is then attached to the guidance unit 400, entrapping head 2402 and coupling lead line to guidance unit 400. The guidance unit 400 then becomes forward-facing guidance unit 400 of transmission cluster 104.

In a similar manner, a head 2502 is formed on trail line 106 and trail line 110 is coupled to a guidance unit 400, which guidance unit 400 then becomes backward-facing guidance unit 400 of reception cluster 104". Trail line 110 differs from lead line 106 in that trail line 110 contains as a core an electrical cable 2504 containing a plurality of electrical conductors 2506 that serve to convey power to and electrical signals from reception device 1604 in reception unit 1400.

When required, passages 1606, 1302, 1006, and 708 may be used to pass cable 2504 and/or conductors 2506 forward to transmission device 1004.

Since system 100 is intended to inspect pipeline 102 when pipeline 102 is not under pressure, it is not a requirement of the present invention that transmission unit 800 and reception unit 1400 be sealed against moisture under pressure.

In summary, the present invention teaches a pipe-inspection system 100. Pipe-inspection system 100 is compatible with remote-field eddy-current techniques for inspection of a pipeline 102. Pipe-inspection system 100 is configured to easily negotiate bends, junctions, and obstacles within pipeline 102. Pipe-inspection system 100 is fabricated of sanitary, non-contaminating, non-damaging, lightweight materials selected to produce minimal friction within pipeline 100.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A pipe-inspection system for the inspection of a pipeline, said system comprising:

four wheeled guidance units;

a transmission unit flexibly coupled between first and second ones of said wheeled guidance units;

a reception unit flexibly coupled between third and fourth ones of said wheeled guidance units, wherein said second wheeled guidance unit is flexibly coupled to said third wheeled guidance unit;

a lead line coupled to said first wheeled guidance unit and configured to move said system through said pipeline in a forward direction; and a trail line coupled to said fourth wheeled guidance unit and configured to move said system through said pipeline in a reverse direction substantially opposite said forward direction.

2. A pipe-inspection system as claimed in claim 1 wherein each of said wheeled guidance units comprises a plurality of wheels disposed about said wheeled guidance unit so that two of said wheels contact an inner surface of said pipeline at any given time.

3. A pipe-inspection system as claimed in claim 1 wherein each of said wheeled guidance units comprises:

a first tier of wheels positioned at a first radial distance from an axis of said wheeled guidance unit; and a second tier of said wheels positioned at a second radial distance from said axis, wherein said second radial distance is less than said first radial distance.

4. A pipe-inspection system as claimed in claim 1 wherein each of said wheeled guidance units comprises more than four wheels.

5. A pipe-inspection system as claimed in claim 1 wherein said pipeline has an inner diameter d, where $d \geqq 15$ cm, and wherein each of said wheeled guidance units comprises a plurality of radially disposed wheels, wherein an outermost point on each of said wheels:

has a radial distance r from an axis of said wheeled guidance unit, where $r>0.5$ d when said wheeled guidance unit is not within said pipeline;

moves towards said axis during placement of said wheeled guidance unit within said pipeline; and exerts pressure upon an inner surface of said pipeline when said wheeled guidance unit is within said pipeline.

6. A pipe-inspection system as claimed in claim 1 wherein:

said pipeline has an inner diameter d;

said transmission unit has a diameter w, where $0.4 d \leqq w \leqq 0.6 d$; and said reception unit has a diameter w", where $0.75 d \leqq w'' 0.9 d$.

7. A pipe-inspection system as claimed in claim 1 wherein:

each of said wheeled guidance units has a length g;

said transmission unit has a length h, where $h<g$;

said reception unit has a length h", where $h''<g$; and each of said transmission and reception units are separated from adjacent ones of said wheeled guidance units by a spacing j, where $j<g$.

8. A pipe-inspection system as claimed in claim 1 wherein:

each of said lead and trail lines comprises a polymeric. material; and one of said lead and trail lines comprises a plurality of electrical conductors.

9. A pipe-inspection system as claimed in claim 1 wherein:

said transmission unit comprises a first interior cavity configured to contain a transmission device; and said reception unit comprises a second interior cavity configured to contain a reception device.

10. A pipe-inspection system as claimed in claim 9 wherein:

said transmission device comprises a remote-field eddy-current transmitter; and said reception device comprises a remote-field eddy-current receiver.

11. A pipe-inspection system as claimed in claim 1 wherein one of said lead line and said trail line is configured to communicate electrical signals between said system and outside said pipeline.

12. A pipe-inspection system as claimed in claim 11 wherein:

said lead line is configured as a towing line for a forward direction; and said trail line is configured to carry electrical signals and is configured as a towing line for a reverse direction.

13. A pipe-inspection system as claimed in claim 1 wherein each of said wheeled guidance units comprises:

a first tier of radially disposed wheels configured so that all of said wheels in said first tier contact an inner surface of said pipeline when said wheeled guidance unit is coaxial with said pipeline; and a second tier of radially disposed wheels configured so that none of said wheels in said second tier contact said inner surface when said wheeled guidance unit is coaxial with said pipeline.

14. A pipe-inspection system as claimed in claim 13 wherein:

said first tier of radially disposed wheels are positioned in a first wheel plane substantially perpendicular to said axis; and said second tier of radially disposed wheels are positioned in a second wheel plane substantially parallel to said first wheel plane.

15. A pipe-inspection system as claimed in claim 13 wherein:

said first tier of radially disposed wheels is positioned at a first radial distance from an axis of said wheeled guidance unit; and said second tier of radially disposed wheels is positioned at a second radial distance from said axis, wherein said second radial distance is less than said first radial distance.

16. A pipe-inspection system as claimed in claim 15 wherein each of said wheeled guidance units additionally comprises a third tier of radially disposed wheels positioned at a third radial distance from said axis, wherein said third radial distance is less than said second radial distance.

17. A pipe-inspection system as claimed in claim 1 wherein:

each of said wheeled guidance units comprises:

a core;

a wheel-support cage coupled to said core and comprising a plurality of wheel-support straps;

a first tier of wheels disposed in a first wheel plane, wherein each of said wheels in said first wheel plane is coupled to one of said wheel-support straps; and a second tier of wheels disposed in a second wheel plane substantially parallel to said first wheel plane, wherein each of said wheels in said second wheel plane is coupled to one of said wheel-support straps;

said transmission unit comprises:

a first body having a second interior cavity; and a first lid; and said reception unit comprises:

a second body having a second interior cavity; and a second lid.

18. A pipe-inspection system as claimed in claim 17 wherein:

said core is formed of a polymeric material;

said wheel-support cage is formed of said polymeric material;

each of said wheels in said first tier of wheels are formed of said polymeric material;

each of said wheels in said second tier of wheels are formed of said polymeric material;

said first body is formed of said polymeric material;

said first lid is formed of said polymeric material;

said second body is formed of said polymeric material; and said second lid is formed of said polymeric material.

19. A pipe-inspection system as claimed in claim 18 wherein said polymeric material is high-density polyethylene.

20. A pipe-inspection system as claimed in claim 18 wherein:

each of said wheeled guidance units has an apico-conicoid shape with an apex oriented in one of a forward direction and a reverse direction when said wheeled guidance unit is substantially coaxial with said pipeline;

said transmission unit is substantially cylindrical and is substantially coaxial with said pipeline when said first and second wheeled guidance units are substantially coaxial with said pipeline; and said reception unit is substantially cylindrical and is substantially coaxial with said pipeline when said third and fourth wheeled guidance units are substantially coaxial with said pipeline.

21. A pipe-inspection system for the inspection of a pipeline, said system comprising:

a transmission cluster, wherein said transmission cluster comprises:

a first wheeled guidance unit;

a transmission unit;

a second wheeled guidance unit;

a first flexible inter-unit connector coupled between said transmission unit and said first wheeled guidance unit; and a second flexible inter-unit connector coupled between said transmission unit and said second wheeled guidance unit;

a reception cluster, wherein said reception cluster comprises:

a third wheeled guidance unit;

a reception unit;

a fourth wheeled guidance unit;

a third flexible inter-unit connector coupled between said reception unit and said third wheeled guidance unit; and a fourth flexible inter-unit connector coupled between said reception unit and said fourth wheeled guidance unit;

a flexible inter-cluster connector coupled between said transmission cluster and said reception cluster;

a lead line coupled to said first wheeled guidance unit and configured to move said system through said pipeline in a forward direction; and a trail line coupled to said fourth wheeled guidance unit and configured to move said system through said pipeline in a reverse direction substantially opposite said forward direction.

22. A pipe-inspection system as claimed in claim 21 wherein:

each of said first, second, third and fourth wheeled guidance units have an apico-conicoid shape with an apex and a base;

each of said first and third first wheeled guidance units is a forward-facing guidance unit having said apex oriented in said forward direction relative to said base; and each of said second and fourth wheeled guidance units is a backward-facing guidance unit having said apex oriented in said reverse direction relative to said base.

23. A pipe-inspection system as claimed in claim 21 wherein:

said system additionally comprises an intermediate cluster, wherein said intermediate cluster comprises:

a fifth wheeled guidance unit;

an intermediate unit;

a sixth wheeled guidance unit;

a fifth flexible inter-unit connector coupled between said intermediate unit and said fifth wheeled guidance unit; and a sixth flexible inter-unit connector coupled between said intermediate unit and said sixth wheeled guidance unit;

said flexible inter-cluster connector is a first flexible inter-cluster connector coupled between said second and fifth wheeled guidance units; and said system additionally comprises a second flexible inter-cluster connector coupled between said sixth and third wheeled guidance units.

24. A pipe-inspection system as claimed in claim 21 wherein:

said first wheeled guidance unit comprises:

a first apex;

a first base; and a first axis substantially perpendicular to said first base and passing through said first apex, wherein a first passage passes through said first wheeled guidance unit along said first axis; and said fourth wheeled guidance unit comprises:

a second apex;

a second base; and a second axis substantially perpendicular to said second base and passing through said second apex, wherein a second passage passes through said fourth wheeled guidance unit along said second axis.

25. A pipe-inspection system as claimed in claim 24 wherein:

a first force is applied to said lead line in said forward direction;

a second force is applied to said trail line in said reverse direction;

a third force inhibits movement of said system within said pipeline;

said lead line passes through said first passage and is coupled to said first wheeled guidance unit at said first base so as to cause said first force to push said first wheeled guidance unit in said forward direction when said first force exceeds a sum of said second force and said third force; and said trail line passes through said second passage and is coupled to said fourth wheeled guidance unit at said second base so as to cause said second force to push said fourth wheeled guidance unit in said reverse direction when said second force exceeds a sum of said first force and said third force.

26. A pipe-inspection system as claimed in claim 23 wherein:

said pipeline has an inner diameter d:

said transmission cluster has a length c, where $1.4\ d \leqq c \leqq 2.4\ d$;

said intermediate cluster has a length c', where $1.4\ d \leqq c' \leqq 2.4\ d$;

said reception cluster has a length c", where $1.4\ d \leqq c'' \leqq 2.4\ d$;

said first and second inter-cluster connectors are configured so that a center-to-center distance between each of said transmission and intermediate clusters and said intermediate and reception clusters is a distance s, where $1.9\ d \leqq s \leqq 2.2\ d$; and said system has an overall length l exclusive of said lead and trail lines, where $5.2\ d \leqq l \leqq 7.0\ d$.

27. A pipe-inspection system as claimed in claim 26 wherein:

each of said first, second, third, fourth, fifth, and sixth wheeled guidance units has a length g, where $0.45\ d \leqq g \leqq 0.75\ d$;

said transmission unit has a length h, where $0.1\ d \leqq h \leqq 0.3\ d$; and said intermediate unit has a length h', where $0.1\ d \leqq h' \leqq 0.3\ d$;

said reception unit has a length h", where $0.1\ d \leqq h'' \leqq 0.3\ d$;

each of said first and second intra-cluster connectors is configured to effect a spacing j between said transmission unit and one of said first and second wheeled guidance units, where $0.2\ d \leqq j \leqq 0.3\ d$;

each of said fifth and sixth intra-cluster connectors is configured to effect said spacing j between said intermediate unit and one of said fifth and sixth wheeled guidance units; and each of said third and fourth intra-cluster connectors is configured to effect said spacing j between said reception unit and one of said third and fourth wheeled guidance units.

28. A pipe-inspection system as claimed in claim 26 wherein:

said transmission unit has a diameter w, where $0.4\ d \leqq w \leqq 0.6\ d$;

said intermediate unit has a diameter w', where $0.1\ d \leqq w' \leqq 0.25\ d$; and said reception unit has a diameter w", where $0.75\ d \leqq w'' \leqq 0.9\ d$.

29. A pipe-inspection system for the inspection of a pipeline, said system comprising:

a transmission cluster comprising:

a first wheeled guidance unit configured as a forward-facing guidance unit;

a transmission unit flexibly coupled to said first wheeled guidance unit and comprising a remote-field eddy-current transmitter; and a second wheeled guidance unit configured as a backward-facing guidance unit and flexibly coupled to said transmission unit;

a reception cluster comprising:

a third wheeled guidance unit configured as a forward-facing guidance unit and flexibly coupled to said second wheeled guidance unit;

a reception unit flexibly coupled to said third wheeled guidance unit and comprising a remote-field eddy-current receiver; and a fourth wheeled guidance unit configured as a backward-facing guidance unit and flexibly coupled to said reception unit;

a lead line coupled to said first wheeled guidance unit and configured to move said system through said pipeline in a forward direction; and a trail line coupled to said fourth wheeled guidance unit and configured to move said system through said pipeline in a reverse direction substantially opposite said forward direction.

* * * * *